(12) United States Patent
Yuzuki

(10) Patent No.: US 6,697,069 B2
(45) Date of Patent: Feb. 24, 2004

(54) PORTABLE MEASURING DEVICE AND DISPLAY METHOD FOR DISPLAYING A MEASUREMENT

(75) Inventor: Toshiyuki Yuzuki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 336 days.

(21) Appl. No.: 09/765,547

(22) Filed: Jan. 19, 2001

(65) Prior Publication Data

US 2001/0012012 A1 Aug. 9, 2001

(30) Foreign Application Priority Data

Jan. 20, 2000 (JP) .......................................... 2000-22874

(51) Int. Cl.[7] .............................................. G06T 11/00
(52) U.S. Cl. ...................................................... 345/440
(58) Field of Search .............................. 345/440, 440.1, 345/440.2; 702/166; 73/714, 717, 753, 300, 712, 865.1, 865.2

(56) References Cited

U.S. PATENT DOCUMENTS 4,107,995 A * 8/1978 Ligman et al. ............... 73/300

FOREIGN PATENT DOCUMENTS

| DE | 8634419 | 5/1987 |
| DE | 3732100 | 4/1989 |
| EP | 0696740 | 2/1996 |
| EP | 0702235 | 3/1996 |
| JP | 07280651 | 10/1995 |

* cited by examiner

Primary Examiner—Almis R. Jankus
(74) Attorney, Agent, or Firm—Adams & Wilks

(57) ABSTRACT

The measuring equipment of the present invention comprises a pressure sensor for measuring pressure, a first storage unit and a second storage unit for storing display information for displaying measured values, a display panel for carrying out displaying based on the measured values stored in the storage unit, and a switching unit for switching the storage content stored in the storage units in such a manner that measured values acquired in a specific period are maintained. According to this configuration, storage positions of measured values (display information) can be distinguished according to the measurement period and measured values for a specific period can be re-displayed so as to increase the usefulness of the measured information.

7 Claims, 9 Drawing Sheets

↓ SHORT PERIOD MEASURING (FIVE SECOND PERIODS) AFTER TEN SECONDS

↑ SHORT PERIOD MEASURING ENDS

→ SHORT PERIOD MEASURING (FIVE SECOND PERIODS) AFTER ONE HUNDRED SECONDS

■ ...... ALTITUDE MEASURED IN NORMAL MODE (EVERY FIVE MINUTES)

▨ ...... ALTITUDE MEASURED IN SHORT PERIOD MODE (EVERY FIVE SECONDS)

SHORT PERIOD MEASURING (FIVE SECOND PERIODS) AFTER TEN SECONDS

SHORT PERIOD MEASURING ENDS

SHORT PERIOD MEASURING (FIVE SECOND PERIODS) AFTER ONE HUNDRED SECONDS

■ ...... ALTITUDE MEASURED IN NORMAL MODE (EVERY FIVE MINUTES)

▨ ...... ALTITUDE MEASURED IN SHORT PERIOD MODE (EVERY FIVE SECONDS)

SHORT PERIOD
MEASURING
(FIVE SECOND PERIODS)
AFTER TEN SECONDS

SHORT PERIOD
MEASURING
(FIVE SECOND PERIODS)
AFTER ONE HUNDRED
SECONDS

SHORT PERIOD
MEASURING ENDS

...... ALTITUDE MEASURED IN NORMAL MODE
(EVERY FIVE MINUTES)

...... ALTITUDE MEASURED IN SHORT PERIOD MODE
(EVERY FIVE SECONDS)

↓ SHORT PERIOD MEASURING (FIVE SECOND PERIODS) AFTER TEN SECONDS

SHORT PERIOD MEASURING (FIVE SECOND PERIODS) AFTER ONE HUNDRED SECONDS →

↑ SHORT PERIOD MEASURING ENDS

■ ...... ALTITUDE MEASURED IN NORMAL MODE (EVERY FIVE MINUTES)

▨ ...... ALTITUDE MEASURED IN SHORT PERIOD MODE (EVERY FIVE SECONDS)

PORTABLE MEASURING DEVICE AND DISPLAY METHOD FOR DISPLAYING A MEASUREMENT

BACKGROUND OF THE INVENTION

1. Field of the Invention

The present invention relates generally to measuring equipment and, more specifically, to a measuring device for measuring various values such as pressure, altitude and temperature etc. and a display method for displaying the measurements electronically, and particularly relates to a highly portable measuring device.

2. Description of the Prior Art

This kind of portable measuring equipment is, for example, incorporated into the body of a wristwatch and has become widely publicized together with the recent increase in participation in outdoor activities. A block view of the essential parts of the configuration of this kind of related portable measuring equipment is shown in FIG. 8. The portable measuring equipment in FIG. 8 is an altimeter that measures pressure and obtains and displays an altitude based on this pressure, and is configured so as to be incorporated integrally with a wristwatch.

Specifically, this portable measuring equipment comprises an oscillating circuit 100 outputting a reference signal using oscillation, a dividing circuit 101 for dividing this reference signal, a pressure sensor 102 for measuring pressure, an A/D converter 103 for converting pressure outputted from the pressure sensor 102 in the form of an analog signal into a digital signal, a pressure/altitude calculator 104 for calculating altitude by known conversion methods based on pressure outputted from the A/D converter 103, a button group 105 consisting of a plurality of buttons for performing arbitrary instructions, a display panel 106 for displaying time and altitude, a display driver circuit 107 for controlling the display panel 106, a ROM 108 for storing measurement processing programs, etc., a RAM 109 for temporarily storing measured values, and a CPU 110 for controlling each of these parts.

With this related portable measuring equipment, normally, a current time obtained via the oscillating circuit 100 and the dividing circuit 101 is displayed at the display panel 106 via the display driver circuit 107. When an altimeter measurement is designated via the button group 105, an altitude obtained via the pressure sensor 102, A/D converter 103 and pressure/altitude calculator 104 is stored in the RAM 109 and this altitude is displayed at the display panel 106 via the display driver circuit 107.

This altitude measurement is carried out in one period selected from a prescribed plurality of periods and this plurality of periods can be switched over between at the button group 105. For example, the normal period is set to five minutes, and a switched over to period is set to five seconds (in the following, taking measurements in the normal period is referred to as normal mode, and taking measurements in the short period is referred to as short period mode). Measurement can then be carried out by switching over between these periods. By switching over between normal mode and short period mode, the user can be aware of trends in the overall change in altitude and the trend of finer changes in altitude at a specific time. As the storage capacity of the RAM 109 is limited, when altitudes measured in normal mode or short period mode exceed the storage capacity, the oldest altitudes are sequentially overwritten with the newest altitude, which is stored.

A method of displaying altitudes acquired in this manner is now described. FIGS. 9A–9C show examples of altitude displayed using the display panel 106. In FIGS. 9A–9C, a first display region 111 displaying a graph showing the altitude in detail and a second display region 112 displaying the current altitude using characters are provided at the display panel 106. At the first display region 111, seven-segment display lines 113 are arranged in parallel in 24 lines. One altitude is then shown as a bar graph by, for example, inverting segments corresponding to the altitude of the segments of one display line 113. The display lines as a whole then show the altitude as a time series going from the left side to the right side in the drawings. For example, the display line 113 at the left end shows the oldest altitude of the altitudes stored in the RAM 109 and the right end of the display line 113 shows the newest altitude. At the second display region 112, seven-segment display sections 114 are arranged in parallel in 3 lines and the newest of the altitudes stored in the RAM 109 is displayed using characters.

FIG. 9A is an example display of altitude measured in normal mode, with altitude measured in a normal period being displayed sequentially along a time series at the first display region, and the newest altitude=112 (m) being displayed at the second display region.

When the measured mode is changed over to the short period mode at the button group 105, the newest altitude is measured using a short period. The newest altitude is then stored in the RAM 109 in place of the oldest altitude and this altitude is displayed at the display panel 106.

FIG. 9B is an example of a display for an altitude measured in the short period mode, where altitude measured in a short period is displayed continuously along a time series so as to follow on from the altitude taken in the normal period at the first display region 111 (here, segments corresponding to the altitude for the short period are given using diagonal lines in FIG. 9 so that altitude measured in the short period can be distinguished from altitude measured in the normal period). A newest altitude of 135 (m) is displayed at the second display region 112.

When measurement in short mode continues, as shown in FIG. 9C, altitude measured in short periods are displayed consecutively at the first display region 111 and a newest altitude of 117 (m) is displayed at the second display region 112.

When normal mode is then later returned to from short period mode as a result of operation of the button group 105 or the elapsing of a prescribed time limit, etc., a new altitude is measured in a normal period and the newly measured altitude is stored in the RAM 109 in place of the oldest altitude. At the same time, altitudes measured in short periods are shown consecutively at the first display region 111 and altitudes newly measured in normal periods are displayed consecutively, as shown in FIG. 9D.

In a further related example disclosed in Japanese Patent Laid-open Publication 7-280651, in a temperature measuring device for measuring temperature of a measurement subject using an amount of infra-red energy emitted from the measurement subject, consecutive measurements are made possible and temperature trends can be understood.

[Problems to be Solved by the Invention]

However, related portable measuring equipment simply stores altitudes measured in normal mode and altitudes acquired in short-period mode together in a single RAM 109 without providing any separation. An altitude acquired in normal mode is therefore lost every time an altitude measured in a short period is stored during changing over from normal mode to short-period mode. This means that while switching back to normal mode, data for measurements of the altitude made in normal mode on previous occasions has already been lost and therefore cannot be re-displayed.

For example, while switching over from FIG. 9C to FIG. 9D, the altitude measured in normal mode of FIG. 9A cannot be redisplayed and only the altitude taken in normal mode following on from the altitude for the short period mode can be displayed as shown in FIG. 9D. This means that the overall trend in the change in altitude measured in normal mode up until this point cannot be seen and this is detrimental to the usefulness of the measured information.

There is also provided related portable measuring equipment where, when a prescribed designation switch is pressed, a measurement is carried out in a prescribed period of time differing from the normal period of time and stored, with the results of this measurement then being displayed when the display switch is pressed. However, in this case also, data measured in the normal period is erased when the amount of data measured in the other period is substantial and the results of measurements in the normal period can therefore not be seen.

SUMMARY OF THE INVENTION

In order to solve the aforementioned problems, it is the object of the present invention to provide a portable measuring device where values measured in a specific period can be redisplayed without loss even when the measuring period is switched over.

In addition to substantially the same configuration as the related art, the portable measurement device of the present invention comprises a first storage unit 11 and second storage unit 12 for storing measured values (display information) to be displayed, and a switching unit 13 for switching over the storage content stored in these storage units.

According to this configuration, storage positions of measured values (display information) can be distinguished according to the measurement period and measured values (display information) for a specific period can be displayed at an arbitrary timing. Values measured in a specific period can therefore be re-displayed without loss even when switching over between measuring periods, trends in the changing of overall altitude measured over a specific period can be seen, and the usefulness of the measured information can be improved.

In a specific example of the control content of the switching unit 13, when measuring is carried out using a first period, a measured value (display information) is stored in the first storage unit 11 and displaying is carried out at the display panel 7 based on this measured value (display information), and when measuring is carried out using a second period, a measured value (display information) is stored at the second storage unit 12 and displaying is carried out at the display panel 7 based on this measured value (display information).

When this kind of control is carried out, the value measured (display information) in the first period and the value measured (display information) in the second period can be stored and displayed individually and both measured values (display information) can therefore easily be re-displayed. In particular, copying etc. of information between the first storage unit 11 and the second storage unit 12 is not necessary, control of the storage units is therefore straightforward, and the amount of control required is reduced.

In a further example of the content of the control of the switching unit 13, when measuring is carried out using a first period, a measured value (display information) is stored in the first storage unit 11 and the second storage unit 12 and displaying is carried out at the display panel 7 based on this measured value (display information) stored in the first storage unit 11, when measuring is carried out using a second period, a measured value (display information) is stored at the first storage unit 11 and displaying is carried out at the display panel 7 based on this measured value (display information), and the measured value (display information) stored in the second storage unit 12 can be copied to the first storage unit 11 when switching over from measuring in the second period to measuring in the first period.

The loss of the first period can also be prevented in this case and measured values (display information) can easily be re-displayed. In particular, measured values (display information) are supplied from the first storage unit 11 to the display panel 7 and the display driver circuit 8, control of the output path of the measured values (display information) is therefore straightforward, and this reduces the amount of control required.

Further, a display method of the present invention comprises the steps of measuring with measuring means during a first period, storing a measured value measured in the first period in a first storage unit, measuring using the measuring means in a second period differing to the first period, storing a measured value measured in the second period in a second storage unit, and selecting either the first period or the second period, and displaying the measured value of the first storage unit when the first period is selected, and displaying the measured value of the second storage unit when the second period is selected.

Measured values stored in the respective storage units can therefore be held even while switching over between displaying of measured values stored in the first storage unit and the second storage unit.

Further, a display method of the present invention comprises the steps of measuring with measuring means during a first period, storing a measured value measured in the first period in a first storage unit and a second storage unit, measuring using the measuring means in a second period differing to the first period, storing a measured value measured in the second period in the first storage unit; and copying the measured value of the second storage unit over to the first storage unit while switching over from the second period to the first period, and displaying the measured value of the first storage unit.

In this manner, measured values for a first period are normally held in the second storage means and the measured values for the first period are not lost and can be displayed even when switching over from the second period to the first period.

BRIEF DESICRIPTION

A preferred form of the present invention is illustrated in the accompanying drawings in which.

FIGS. 7A—7D are example displays of altitude in a display panel of the second embodiment.

Figure 8:
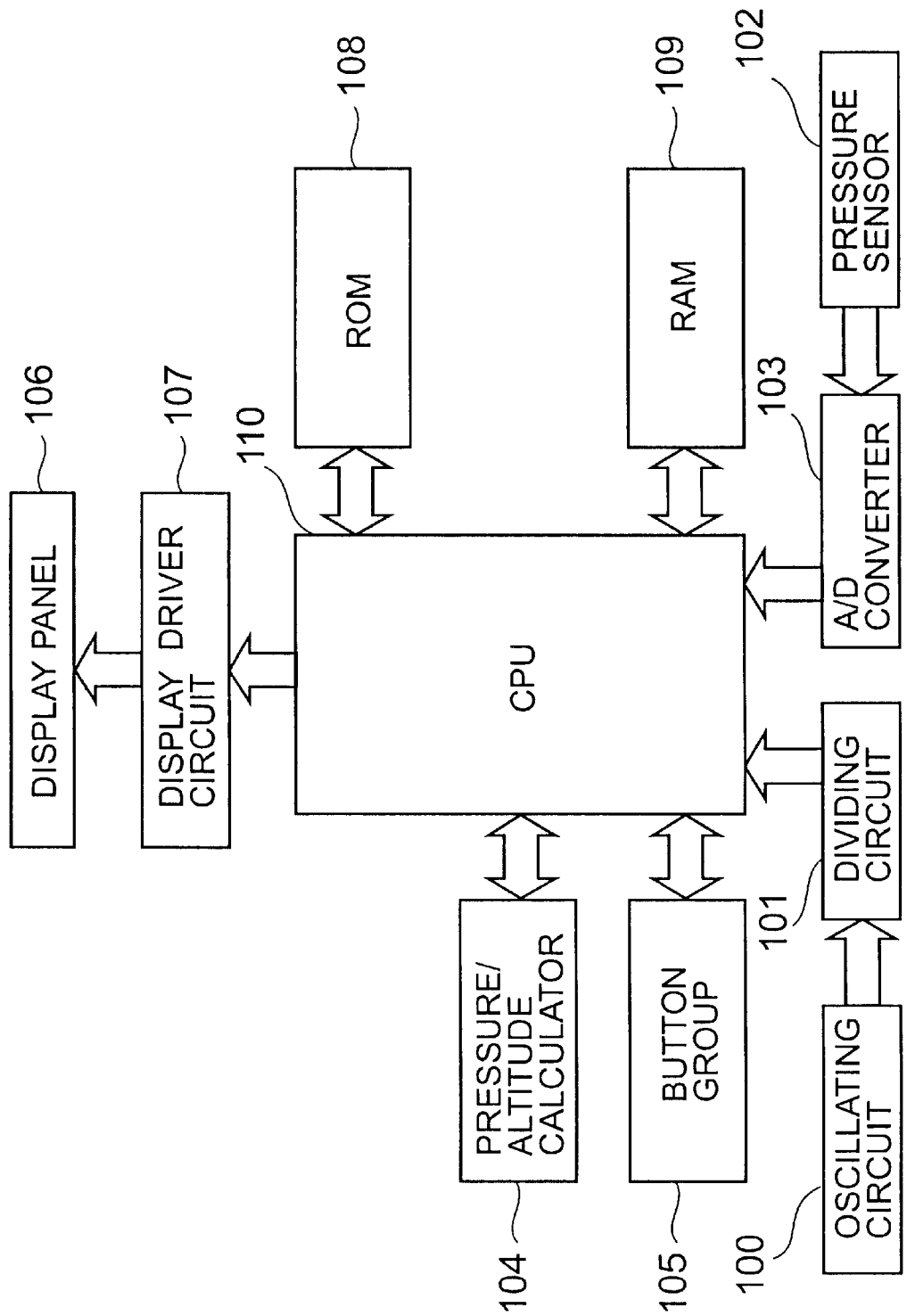
Figure 9A:
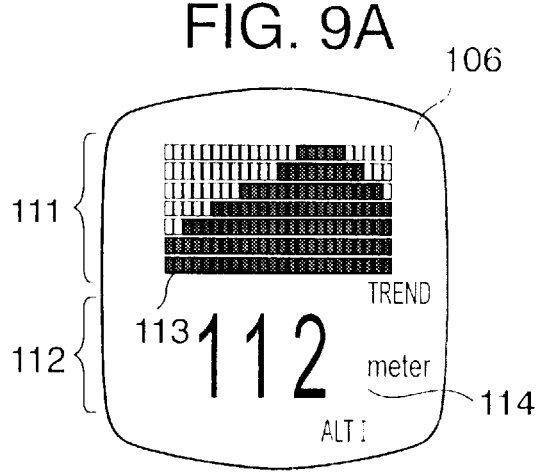
Figure 9B:
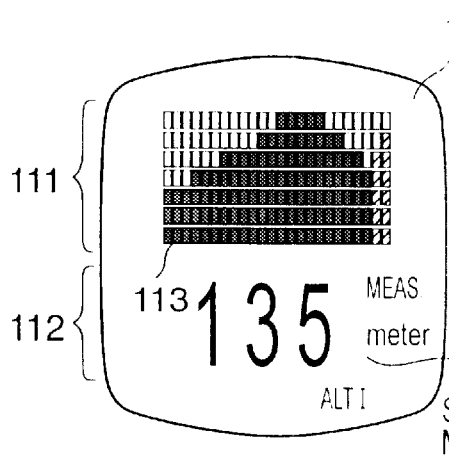
Figure 9D:
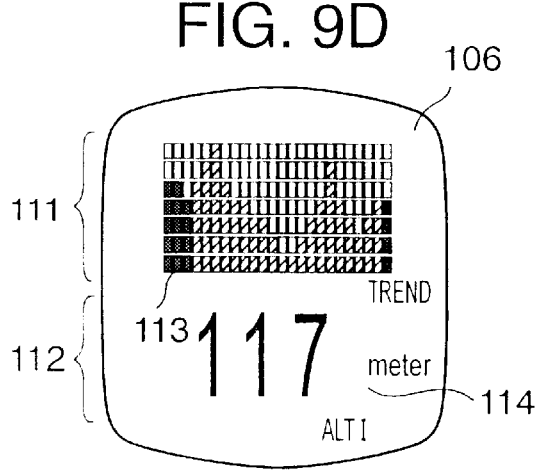
Figure 9C:
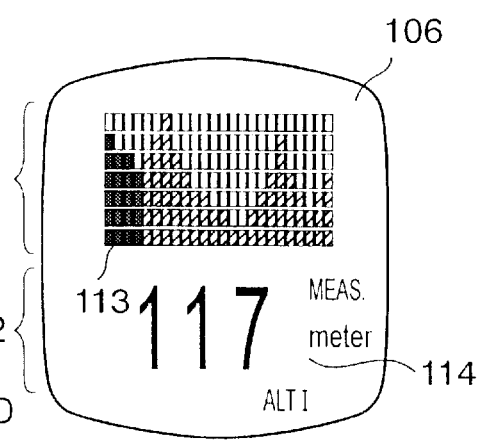

FIG. 8 is a block view of the essential parts of a configuration of a related portable measuring device.

FIGS. 9A–9D are example displays of altitude in the related display panel.

DETAILED DESCRIPTION OF THE PREFERRED EMBODIMENTS

The following is a detailed description based on the drawings of an embodiment of a portable measuring device of the present invention. The present invention is, however, by no means limited by the following embodiments.

<First Embodiment>

Figure 1:
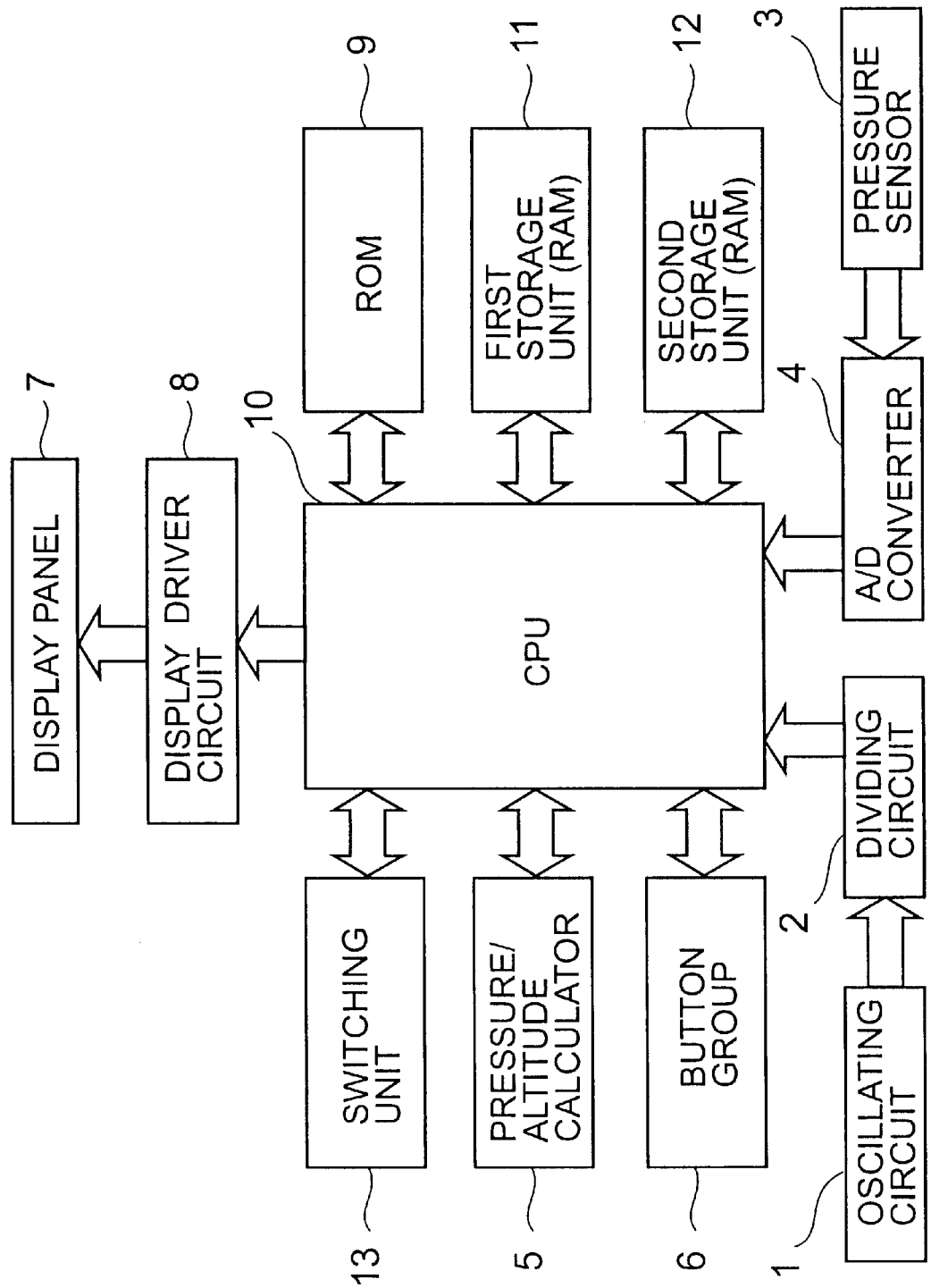
FIG. 1 is a block view of the configuration of essential parts of portable measuring equipment of a first embodiment of the present invention.

FIG. 1 is a block view of essential parts of the configuration of a portable measuring device or equipment of a first embodiment. To give an outline of this embodiment, the portable measuring equipment is provided with a timer function of a clock, and an altitude measuring function for measuring altitude based on pressure. Two storage units are provided for storing altitudes, and are switched over in response to the measuring mode. The portable measuring equipment can also be provided with other arbitrary configuration elements but FIG. 1 mainly only shows elements of the configuration relating to timing and measuring altitude.

In FIG. 1, the portable measuring equipment (hereinafter referred to as "this measuring equipment") of this embodiment is provided with an oscillating circuit 1, a dividing circuit 2, a pressure sensor 3, an A/D converter 4, a pressure/altitude calculator 5, a button group 6, a display panel 7, a display driver circuit 8, a ROM 9, and a CPU 10. Each of these elements of the configuration have the same functions as each of the elements of the configuration of the related art shown in FIG. 8, with the exception of noted special cases, i.e. to give an outline, a reference signal of the oscillating circuit 1 is divided by the dividing circuit 2. Pressure measured at the pressure sensor 3 is converted to a digital signal at the A/D converter 4 and altitude is calculated at the pressure/altitude calculator 5. Time and/or altitude are displayed at the display panel 7 via the display driver circuit 8. Arbitrary instructions are inputted via the button group 105 and programs etc. for the measurement process are stored in the ROM 9 in a non-volatile manner. Each of these parts is controlled by the CPU 10.

This measuring equipment differs from the related art in being provided with the first storage unit 11 and the second storage unit 12 for storing the measured altitude and being provided with the switching unit 13 for switching over the storage content etc. of these storage units.

The first storage unit 11 is a storage means for storing altitude measured in normal mode or short-period mode. The storage capacities of the first storage unit 11 and the second storage unit 12 respectively are decided at a maximum number of altitudes that can be displayed at the display panel 7 at least one time. For example, the first storage unit 11 and the second storage unit 12 should each be capable of storing 24 altitudes for the case where 24 altitudes are to be displayed at one time at the display panel 7. The oldest altitude is then sequentially overwritten with the newest altitude when the altitudes measured exceeds a prescribed number.

The first storage unit 11 and the second storage unit 12 are configured of RAM in this embodiment but other additional arbitrary recording media (for example, an EEPROM) can also be employed. It is also possible to employ, for example, a single physical media as the recording units and separate this media into two sections using partitioning or addressing, providing that the functions of the first storage unit 11 and the second storage unit 12 are distinct.

The switching unit 13 is a means for switching over between the storage content stored in the first storage unit 11 and the second storage unit 12 according to the mode selected, and switching over which storage unit supplies the measured values (display values) to the display driver circuit 8. The specific content of this switching process is described later.

Of the elements configuring this measuring equipment, all or an arbitrary one of the pressure/altitude calculator 5 and the switching unit 13 can be configured from the CPU 10 and a program that can be understood by a CPU or by wired logic. Further, arbitrary non-volatile storage means can be employed in place of the ROM 9.

Figure 2:
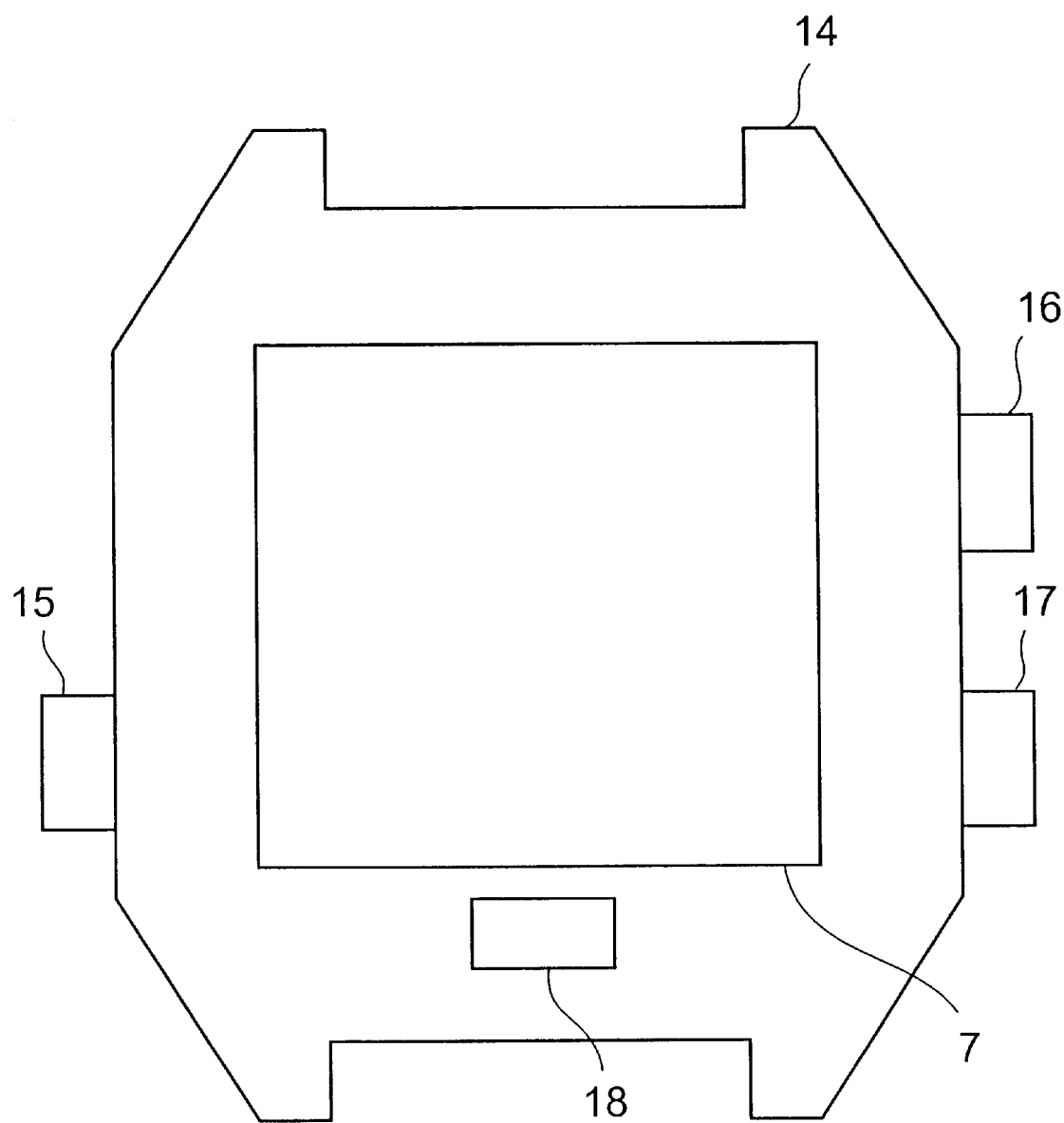
FIG. 2 is an outline view of the measuring equipment of the first embodiment.

The external appearance of this measuring equipment is shown in FIG. 2. In FIG. 2, the main elements of this configuration for the measuring equipment are provided within a watch case 14 taken as a case. The display panel 7 is provided at the center of the front surface of the watch case 14, and a time/altitude changeover button 15, short period measuring start button 16, short period measuring stop button 17, and light button 18 constituting the button group 6 are provided at the side of the watch case 14, as also shown in FIG. 2. The time/altitude changeover button 15 is a button for switching over between displaying time and displaying altitude, and the short period measuring start button 16 is a button designating the start of measuring in short-period mode. The short period measuring stop button 17 is a button for designating the end of measuring in short-period mode, and the light button 18 is a button for designating the illumination of a back light of the display panel 7. The specific arrangement of each element of the configuration can be arbitrarily changed.

Next, a description is given of an altitude display process for the measuring equipment of this configuration. A current time acquired via the oscillating circuit 1 and the dividing circuit 2 is displayed at the display panel 7. The altitude displaying process is then started as a result of the time/altitude changeover button 15 being pressed, and the display panel 7 is switched over to displaying altitude. At first this display is measuring altitude in normal mode, and changes over to measuring in short-period mode upon the short period measuring start button 16 being pressed. Measurements in this short-period mode then end when prescribed completion conditions are fulfilled (when the short period measuring stop button 17 is pressed, when a prescribed time limit has elapsed, or when a situation where it has become difficult to take measurements in short-period mode, such as when noise is predicted due to the electroluminescent light for the back light being illuminated using the light button 18, has arisen), and the taking of measurements in normal mode is returned to.

Figure 3:
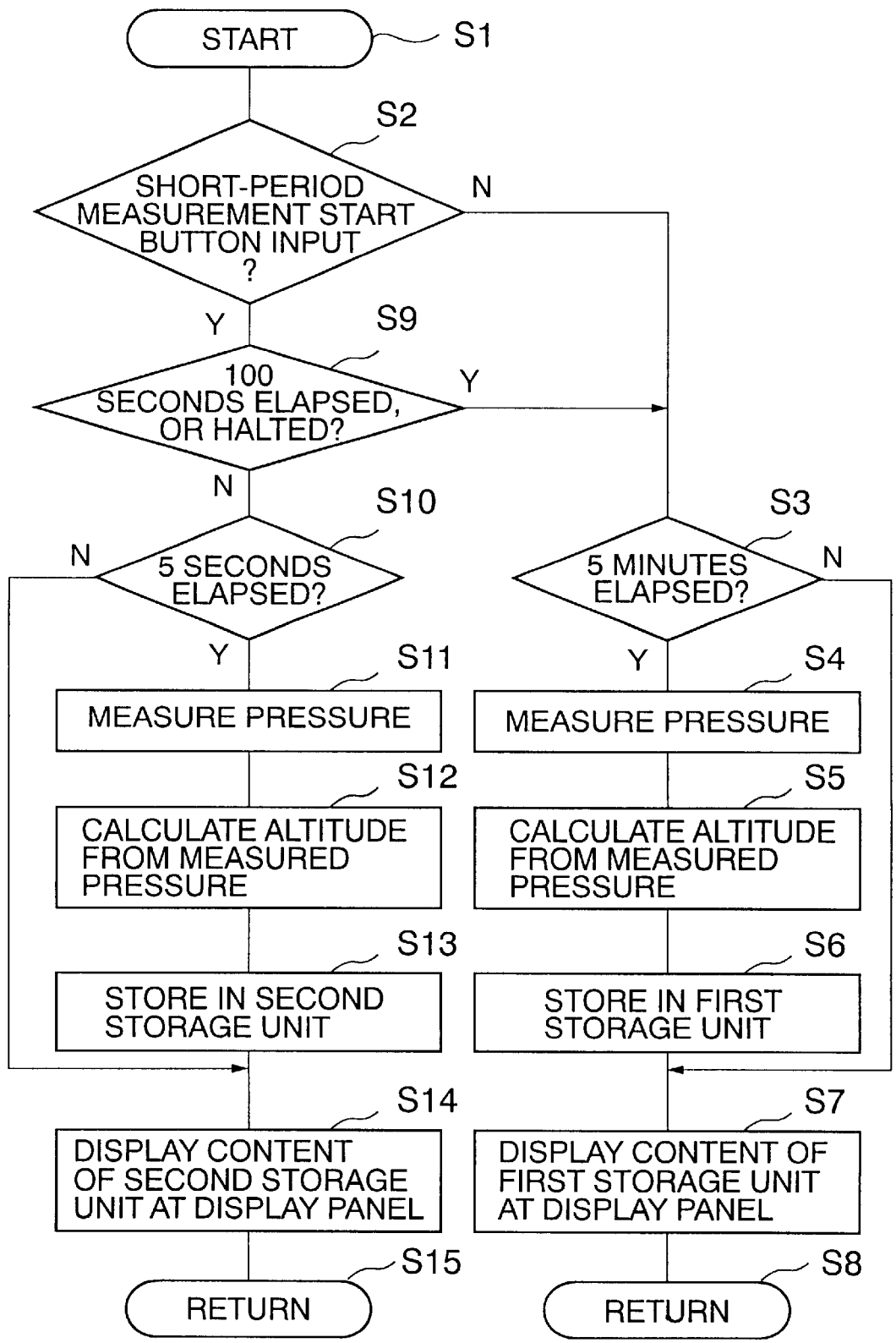
FIG. 3 is a flowchart of the altitude measuring process of the first embodiment.

A detailed description is now given of the contents of this altitude displaying process. FIG. 3 shows a flowchart of this altitude displaying process. This process starts as a result of the time/altitude changeover button 15 being pressed (step S1), and whether or not the short period measuring start button 16 is pressed is confirmed (step S2). When the short period measuring start button 16 is not pressed, i.e. when measuring in normal mode, a determination is made as to whether or not a prescribed normal period (five minutes in this case) has elapsed (step S3).

When it is determined that the prescribed normal period has elapsed (selection of Y in step S3), measurement of pressure at the pressure sensor 3 for the elapsed time commences (step S4), and an altitude is obtained at the pressure/altitude calculator 5 (step S5) after this pressure is converted into a digital signal at the A/D converter 4. This altitude is outputted to the first storage unit 11 and stored under the control of the switching unit 13 (step S6). The altitude stored at the first storage unit 11 is then outputted to the display driver circuit 8 and displayed at the display panel 7 (step S7). On the other hand, when it is determined that the prescribed normal period has not elapsed (the selection of NO in step S3), the pressure is not measured, and the altitude stored at the first storage unit 11 is outputted to the display driver circuit 8 and displayed at the display panel 7 (step S7). This process is then repeated until there is a further designation (step S8).

When short-period mode is switched over to as a result of the short period measuring start button 16 being pressed (when YES is selected in step S2), the process proceeds from step S2 to step S9. In step S9, it is determined whether or not conditions for ending short-period mode are satisfied.

When conditions for ending the short-period mode are not satisfied in step S9 (when NO is selected in step S9), the process proceeds to step S10. In step S10, a determination is made as to whether or not a prescribed short period of time (five seconds in this case) has elapsed. When this is the case (when YES is selected in step S10), measurement commences at the elapsed time. This measurement is carried out in the same manner as for normal mode with the exception that the period is different. The pressure is measured by the pressure sensor 3 (step S11), and an altitude is obtained at the pressure/altitude calculator 5 (step S12) after this pressure is converted to a digital signal by the A/D converter 4.

The second storage unit 12 is switched over to from the first storage unit 11 under the control of the switching unit 13 prior to storing the altitude and the altitude is therefore stored in the second storage unit 12 (step S13). At the same time, the source of supplying the measured values (display information) to the display driver circuit 8 is switched over from the first storage unit 11 to the second storage unit 12. The altitude stored at the second storage unit 12 is then outputted to the display driver circuit 8 and displayed at the display panel 7 (step S14). On the other hand, when it is determined that the prescribed short period of time has not elapsed (when NO is selected in step S10), the content of the second storage unit is displayed without measuring the pressure. This process is then repeated until the conditions for ending the short-period mode are fulfilled (step S15).

When the conditions for ending are fulfilled thereafter in step S9, measuring of altitude in normal mode is returned to. At this time, the storage destination for the altitude is switched over to the first storage unit 11 under the control of the switching unit 13, and the source for supplying the measured values (display information) to the display driver circuit 8 is switched over to the first storage unit 11. The acquired altitude is therefore stored in the first storage unit 11 as at the start of normal mode, and is displayed at the display panel 7.

According to this process, storage content of the first storage unit 11 is not lost even when measuring altitude afresh in the short-period mode and altitudes that were previously acquired in normal mode can be displayed again when normal mode is returned to.

Although not shown in the drawings, the newest pressure, altitude, and temperature values can be stored in a storage unit capable of temporary storage and can be displayed when switching modes. Alternatively, just the newest data stored in the first storage unit 11 can be displayed while displaying the contents of the second storage unit 12 and, conversely, just the newest data stored in the second storage unit 12 can be displayed while displaying the contents of the first storage unit 11.

FIG. 4 shows an example of altitude displayed using the display panel 7. In FIG. 4, a first display region 20 and a second display region 21 are provided at the display panel 7, as in the related art. Further, 24 lines of display lines 22 each composed of seven segments are provided at the first display region 20 and the altitude is displayed as a sequential bar graph going along a time series from the left to the right of the drawing. At the second display region 21, seven-segment display sections 23 are arranged in parallel in 3 lines and the newest of the altitudes is displayed using characters.

Figure 4A:
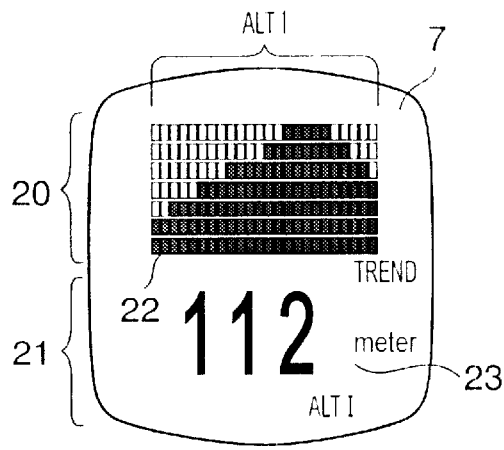
FIGS. 4A–4D are example displays of altitude in the display panel of the first embodiment.

In FIG. 4, FIG. 4A is an example display of altitude measured in normal mode, where altitude measured in normal mode and stored in the first storage unit 11 is displayed consecutively along a time series (shown by ALT 1) at the first display region 20. The newest altitude of 112 (m) of the altitudes stored at the first storage unit 11 is displayed at the second display region 21. The characters "TREND" pointing out the trend in the measurements in normal mode, the units of altitude "meters", and the characters "ALTI" indicating the altitude are also displayed at the display panel 7.

Figure 4D:
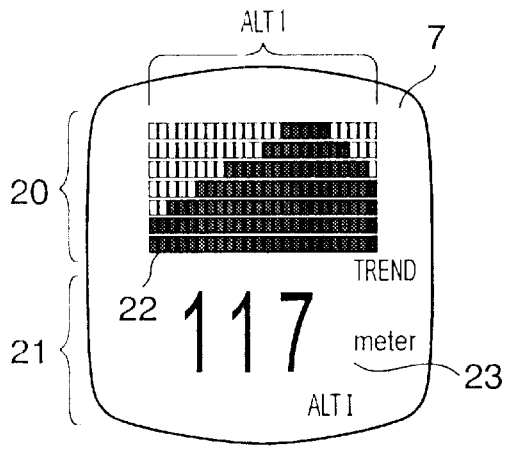
Figure 4B:
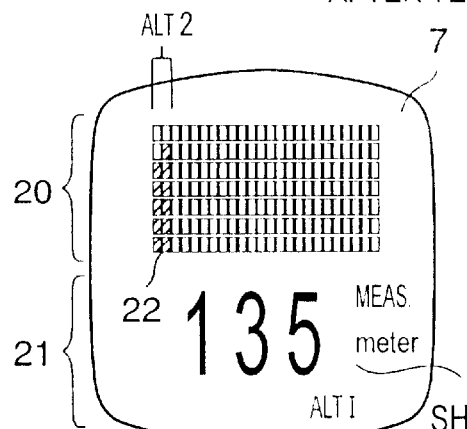

FIG. 4B is an example of a display for altitude measured in short-period mode. After switching to short-period mode, the display content of the first display region 20 of the display panel 7 is cleared once, and the altitude acquired in short-period mode is displayed sequentially from the left end of the first display region 20 (shown by ALT2). The newest altitude of 135 (m) stored at the second storage unit 12 is displayed at the second display region 21, with the characters "MEAS." Indicating that measurements are being made in short-period mode being displayed at the display panel 7 in place of the characters "TREND".

Figure 4C:
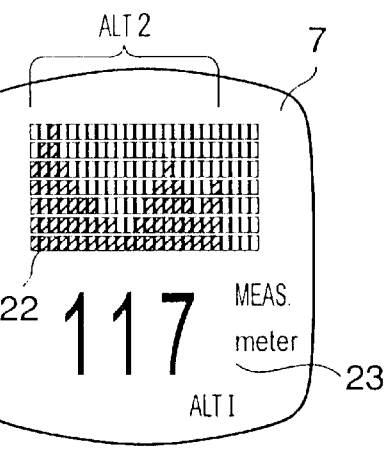
Figure 5A:
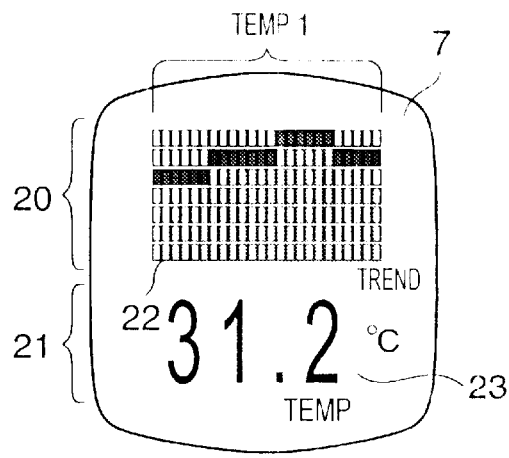
FIGS. 5A–5D are example displays of temperature measured with the first embodiment.
Figure 5D:
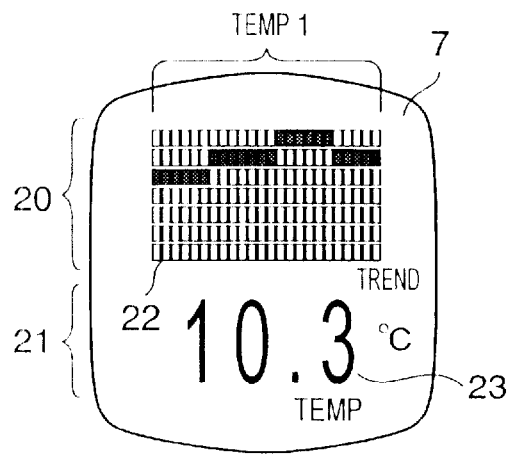
Figure 5B:
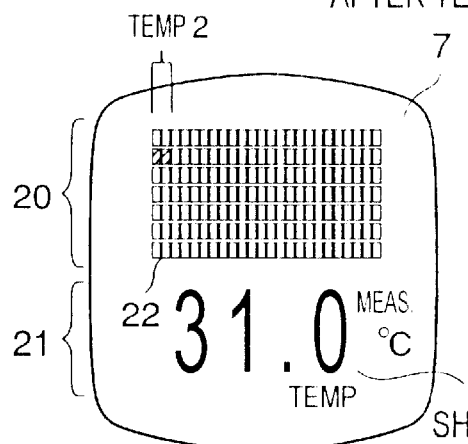
Figure 5C:
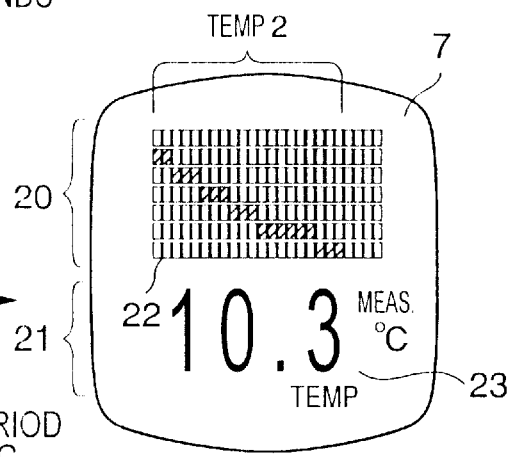

When measurement is carried out in short-period mode, the altitudes stored in the second storage unit 12 are displayed consecutively, as shown in FIG. 4C, and an altitude of 117 (m) is displayed as the newest altitude stored at the second storage region 12.

After this, when switching over to displaying in normal mode, the altitudes are stored in the first storage unit 11 and are displayed at the display panel 7 under the control of the switching unit 13. At this time, as shown in FIG. 4D, the same altitude as the altitude from directly prior to changing over to short-period mode (the altitude shown in FIG. 4A) is displayed at the display panel 7 at the first display region 20 because there has yet to be even one altitude captured since switching over from normal mode. This altitude display is then continued and a newly acquired altitude is displayed in normal mode. By displaying in this manner, the trend in the change in altitude for the previous normal mode can be understood when returning to normal mode.

When normal mode is returned to, the altitude first displayed at the second display region 21 is the last altitude in normal mode directly prior to changing over to short-period mode (the final normal altitude, the altitude 112 shown in FIG. 4A). There is therefore also a possibility that the user may consider that there is incompatibility or that the measurements were not carried out correctly. In such cases, the final altitude measured in short-period mode (the short-period final altitude, the altitude 117 shown in FIG. 4C) can be displayed at the 21. However, when displaying is carried out in this manner, the altitudes displayed at the first display region 20 and the second display region 21 will not coincide until measuring in normal mode commences.

Here, for example, just the current altitude can be stored at a specific location separate from other measured values (display information) and displayed. Alternatively, just information for the graph to be displayed at the first display region 20 can be stored at the first storage unit or the second storage unit, and characters displayed at the second display region 21 can immediately display the altitude outputted at the pressure/altitude calculator 5. It goes without saying that this altitude is displayed at both the first display region 20 and the second display region 21 while the next altitude is being acquired in normal mode and that the content displayed by both regions therefore matches.

The example displays shown in FIGS. 4A–4C are only given as examples and any arbitrary display method can be adopted provided that the altitude acquired in normal mode directly prior to returning can be seen when normal mode is returned to.

In addition, in the above description, in addition to a time function for a wristwatch, a description is given of measuring equipment provided with a function of an altimeter for measuring altitude based on pressure. However, the measuring equipment of the present invention can also be given the same configuration as equipment for measuring arbitrary targets of measurement other than altitude, such as, for example, atmospheric pressure, temperature, humidity, and noise, etc. When various targets of measurement are measured and these measured values are displayed, it goes without saying that the display method can be applied to the measurement target.

For example, example displays for the case of measuring temperature are shown in FIG. 5. In FIG. 5, just one segment corresponding to a peak level measured for temperature is inverted at each display line 22 of the first display region 20 of the display panel 7, and characters for the measured temperature are displayed at the second display region 21 (the temperature in normal mode is shown as TEMP1, and the temperature in short-period mode is shown as TEMP2. In this case, at the display panel 7, "° C." is displayed in place of the aforementioned characters for "meters", and the characters "TEMP" are displayed to indicate the measured temperature. In FIG. 5, the temperature measured in normal mode (FIG. 5A) and the temperature measured in short-period mode (FIGS. 5B, C) are displayed, with the temperature directly prior to switching to short-period mode being displayed while switching to normal mode (FIG. 5D).

<Second Embodiment>

Figure 6:
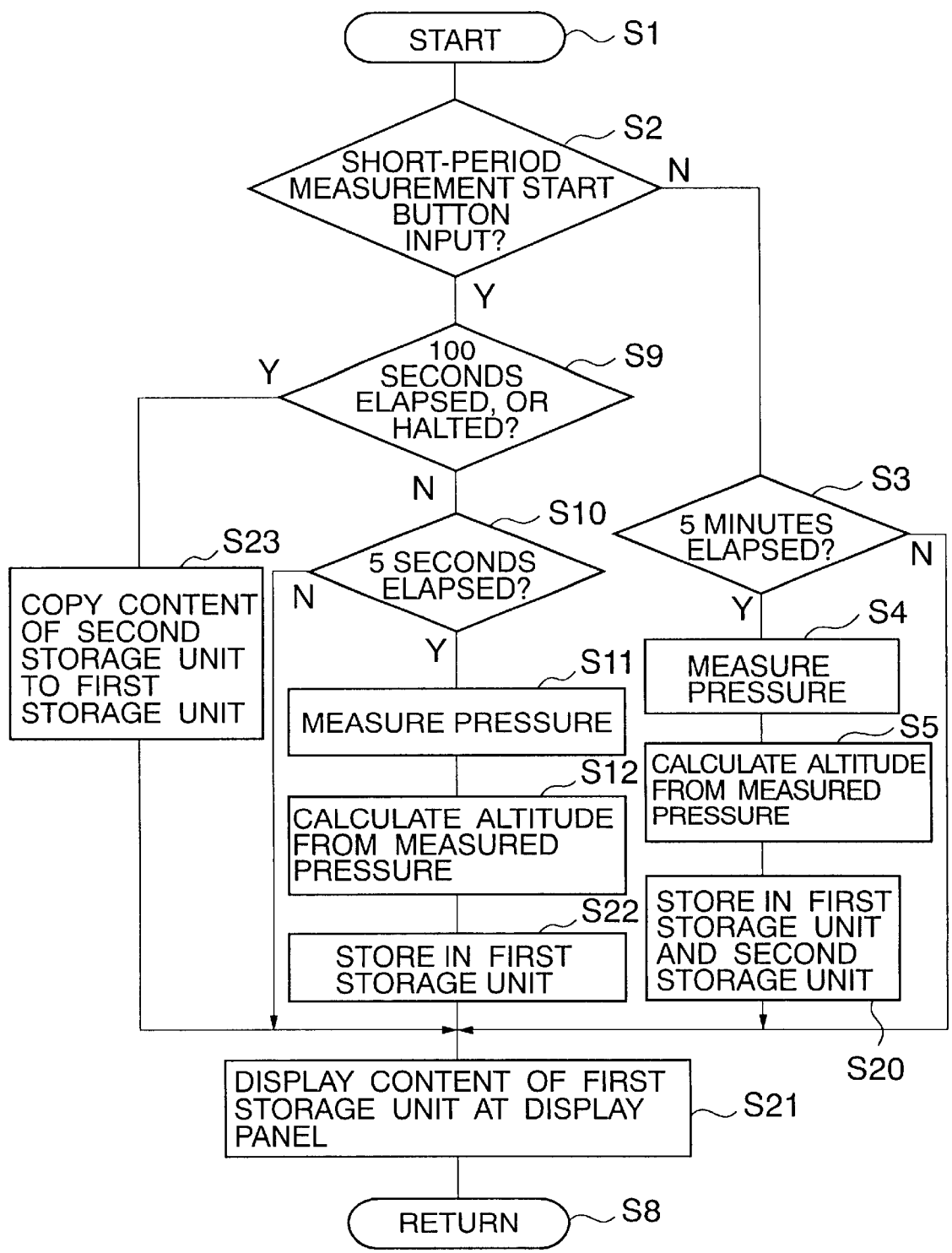
FIG. 6 is a flowchart of an altitude measuring process of a second embodiment of the present invention.

FIG. 6 shows a flowchart of an altitude display process of a second embodiment. To give an outline of this embodiment, a portable measuring device employs a first recording unit principally as a storage unit, and employs a second recording unit for backing up altitudes acquired in normal mode. In particular, aspects of the configuration and process which are not described are the same as for the first embodiment and identical aspects of the configuration and process are given the same numerals.

This embodiment has the same basic configuration as the first embodiment but the measuring equipment differs in that the content of switching control exerted by the switching unit 13 is different. Namely, the switching unit 13 controls only the recorded content of the first storage unit 11 and the second storage unit 12 each time the mode is switched, while on the other hand, the source of supplying the measured values (display information) to the display driver circuit 8 is fixed to be the first storage unit 11.

A detailed description is now given of the contents of this process. As shown in FIG. 6, altitude acquired in normal mode is stored in both the first storage unit 11 and the second storage unit 12 (step S20). The altitude stored at the first storage unit 11 is then outputted to the display driver circuit 8 and displayed at the display panel 7 (step S21).

On the other hand, the storage destination of the acquired altitude is switched over to just being the first storage unit 11 under the control of the switching unit 13 while switching over to short-period mode. The altitude is therefore just stored in the first storage unit 11 (step S22), and the content of this first storage unit 11 is displayed at the display panel 7 (step S21).

After that, when it is determined in step S9 that conditions for ending the short-period mode are fulfilled, the altitude stored in the second storage unit 12 is copied to the first storage unit 11 (step S23), and the content of the first storage unit 11 is displayed at the display panel 7 (step S21). Measuring in normal mode is then returned to, and as described above, the acquired altitude is stored in both the first storage unit 11 and the second storage unit 12 (step S20), and the altitude stored in the first storage unit 11 is displayed at the display panel 7 (step S21).

According to this process, in normal mode altitude is stored in both the first storage unit 11 and the second storage unit 12. In short period mode, a new altitude is stored in the first storage unit 11. The content of the first storage unit 11 is then returned to it's original state using the content of the second storage unit 12 while returning to normal mode, and the altitude acquired in normal mode can therefore be maintained.

Figure 7A:
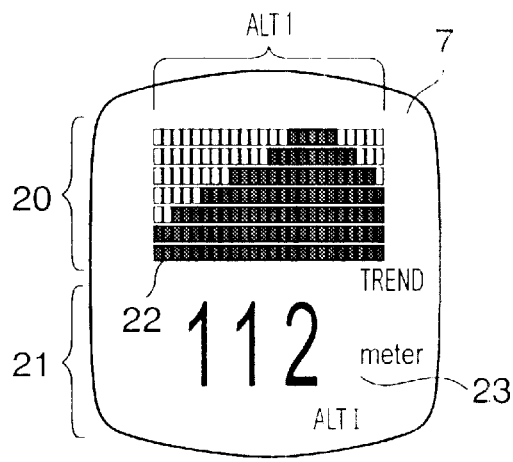
Figure 7B:
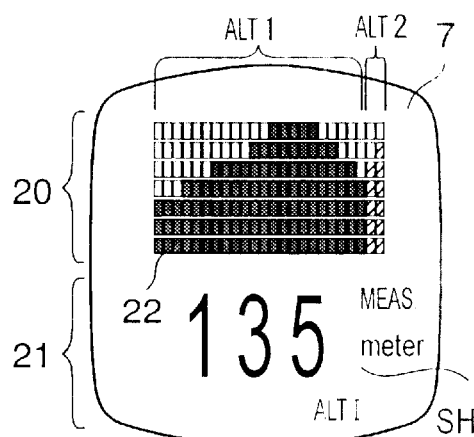
Figure 7D:
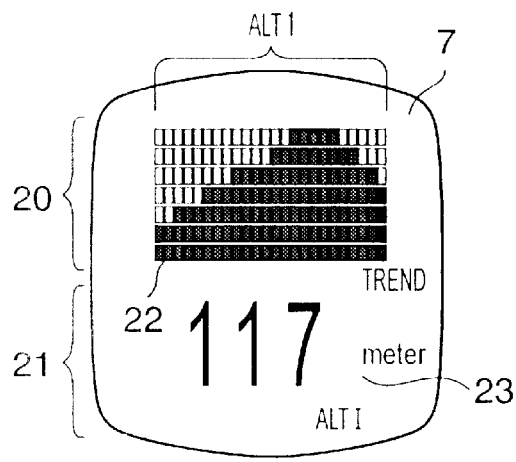
Figure 7C:
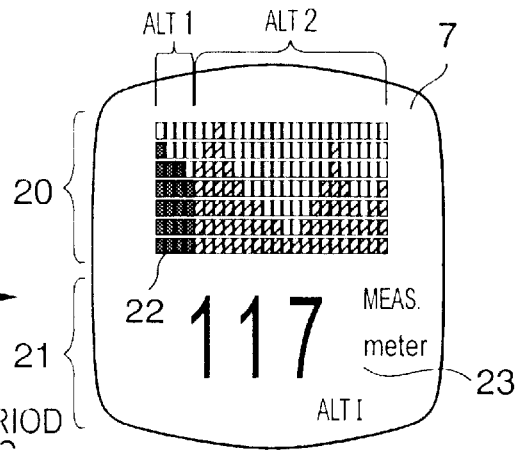
Figure 7C:
Figure 7C:

FIGS. 7A–7C show examples of altitude displayed using the display panel 7. In FIG. 7A, the altitude acquired in normal mode is displayed in the same manner as in FIG. 4A.

FIG. 7B is an example display of altitude measured in short-period mode, where altitude measured in short-period mode and stored in the first storage unit 11 is displayed consecutively along a time series at the first display region 20 so as to follow on from altitude measured in the normal period. When measurement is carried out in short-period mode, the altitudes stored in the first storage unit 11 are displayed consecutively, as shown in FIG. 7C.

When displaying in normal mode is subsequently switched over to, the content of the second storage unit 12 is copied to the first storage unit 11. The altitude acquired in normal mode on the previous occasion can therefore be displayed in the same manner as for FIG. 4D, as shown in FIG. 7D.

In addition to the aforementioned embodiments, the present invention may also be embodied by other different embodiments, providing such embodiments are within the scope of the technological ideas laid out in the patent claims.

For example, in the above embodiments, a description is given of the case of switching over between two periods of a normal period and a short-period, but switching between an arbitrary plurality of three or more periods is also possible. In this case, measured values (display information) for a specific period it is wished to maintain can be stored in a specific first storage unit, and measured values (display information) for a plurality of other periods can then be written to separate first storage units, with displaying then being carried out in the same manner as in the above. Alternatively, three or more storage units corresponding to the number of periods can be provided.

In the above embodiments, a description is given of when the storage content of the storage units is altitude but this is by no means limited to altitude itself, and arbitrary measured values (display information) for displaying this altitude may be stored. For example, graphic information corresponding to altitude can be stored in the storage units.

As described above, according to the portable measuring equipment of the present invention, a configuration is provided with a plurality of storage means for storing measured values (display information) to be displayed, and switching means for switching over storage content stored at the plurality of storage means. The storage position of measured values (display information) can therefore be distinguished according to the measuring period and values measured (display information) in a specific period can be displayed at an arbitrary timing. Measured values measured in a specific period can therefore be redisplayed without loss and the usefulness of measured information can be improved.

Further, in the case where, when measuring is carried out using a first period, measured values (display information) are stored at the first storage means and displaying is carried out at the display means based on these measured values (display information, and when measuring is carried out using the second period, measured values (display information) are stored in the second storage means and displaying is carried out at the display means based on these measured values (display information), it is not necessary to copy information between the first storage means and the second storage means, control of the storage means is simplified, and the amount of control required is therefore reduced.

Alternatively, when measuring is carried out using a first period, measured values (display information) are stored in the first information means and the second information means, and displaying is carried out at the display means based on the measured values (display information) stored at the first storage means, when measuring is carried out using a second period, measured values (display information) are stored at the first storage means and displaying is carried out at the display means based on these measured values (display information), and when measured values (display information) stored in the second storage means are copied to the first storage means while switching from measuring using the second period to measuring using the first period, measured values (display information) are normally supplied from the first storage means to the display means. This simplifies control of the output path of the measured values (display information) and reduces the amount of control required.

What is claimed is:

1. A measuring device comprising:
   measuring means for acquiring measurement values in a period selected from a plurality of periods;
   a plurality of storage units for storing the measurement values obtained by the measuring means;
   a display unit for displaying information corresponding to the measurement values stored in the storage units; and
   a switching unit for switching between the measurement values stored in the storage units so that the measurement values acquired in the selected period and previously stored in the storage units are maintained for arbitrary re-display by the display unit.

2. A measuring device comprising:
   measuring means for acquiring measurement values in a period selected from a first period and a second period;
   first and second storage units for storing the measurement values obtained by the measuring means;
   a display unit for displaying information corresponding to the measurement values stored in the first and second storage units; and
   a switching unit for switching the storage content stored in the first and second storage units so that the measurement values acquired in the selected period are maintained;
   wherein the switching unit switches the contents stored in the first and second storage units so that a first measurement value measured in the first period is stored in the first storage unit and the second storage unit and information corresponding to the first measurement value is displayed by the display unit, so that a second measurement value measured in the second period is stored in the first storage unit and information corresponding to the second measurement value is displayed by the display unit, and so that the first measurement value stored in the second storage unit is copied over to the first storage unit while the switching unit switches over from measuring in the second period to measuring in the first period.

3. A display method, comprising the steps of: measuring a first measurement value in a first period; storing the first measurement value in a first storage unit; measuring a second measurement value in a second period different from the first period; storing the second measurement value in a second storage unit; switching between the first and second measurement values previously stored in the first and second storage units; and selectively displaying and re-displaying the first measurement value previously stored in the first storage unit when switching from the second measurement value to the first measurement value or the second measurement value previously stored in the second storage unit when switching from the first measurement value to the second measurement value.

4. A display method, comprising the steps of: measuring a first measurement value in a first period; storing the first measurement value in a first storage unit and a second storage unit; measuring a second measurement value in a second period different from the first period; storing the second measurement value in the first storage unit; copying the first measurement value stored in the second storage unit over to the first storage unit while switching over from measuring in the second period to measuring in the first period; and displaying the first and second measurement values stored in the first storage unit.

5. A measuring device comprising:
   measuring means for acquiring measurement values in a period selected from a first period and a second period;
   first and second storage units for storing the measurement values obtained by the measuring means;
   a display unit for displaying information corresponding to the measurement values stored in the first and second storage units; and
   a switching unit for switching the storage content stored in the first and second storage units so that the measurement values acquired in the selected period are maintained;
   wherein the switching unit switches the contents stored in the first and second storage units so that a first measurement value measured in the first period is stored in the first storage unit and information corresponding to the first measurement value is displayed by the display unit and so that a second measurement value measured in the second period is stored in the second storage unit and information corresponding to the second measurement value is displayed by the display unit.

6. A measuring device comprising: a measuring unit for measuring at least one of altitude, temperature and pressure at different measurement periods; a plurality of storage units for storing measurement values corresponding to at least one of altitude, temperature and pressure measured by the measuring unit; a display unit for displaying information corresponding to the measurement values previously stored in the storage units; and a switching unit for switching between displaying and re-displaying of measurement values previously stored in the storage units.

7. A measuring device according to claim 6; wherein the storage units comprise a first storage unit for storing a first measurement value corresponding to a pressure measured at a first measurement period and a second storage unit for storing a second measurement value corresponding to a pressure measured at a second measurement period; and further comprising a display driver circuit for controlling the display unit to selectively display each of the first and second measurement values.

\* \* \* \* \*